United States Patent
Mayer

(10) Patent No.: US 8,060,535 B2
(45) Date of Patent: Nov. 15, 2011

(54) METHOD AND APPARATUS FOR INFORMATION AND DOCUMENT MANAGEMENT

(75) Inventor: Paul G. Mayer, Mountain View, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 613 days.

(21) Appl. No.: 11/891,085

(22) Filed: Aug. 8, 2007

(65) Prior Publication Data

US 2009/0043598 A1    Feb. 12, 2009

(51) Int. Cl.
G06F 7/00 (2006.01)
G06F 17/30 (2006.01)

(52) U.S. Cl. ........ 707/795; 707/796; 707/803; 707/805; 707/806

(58) Field of Classification Search ............... 707/104.1, 707/793, 795, 796, 803, 805, 806
See application file for complete search history.

(56) References Cited

U.S. PATENT DOCUMENTS

| | | | | |
|---|---|---|---|---|
| 5,893,093 | A * | 4/1999 | Wills | 1/1 |
| 6,167,394 | A * | 12/2000 | Leung et al. | 1/1 |
| 6,226,646 | B1 * | 5/2001 | Geurts | 1/1 |
| 6,934,634 | B1 | 8/2005 | Ge | |
| 7,031,954 | B1 | 4/2006 | Kirsch | |
| 7,043,365 | B2 * | 5/2006 | Inbar et al. | 701/213 |
| 7,158,878 | B2 | 1/2007 | Rasmussen et al. | |
| 7,231,405 | B2 * | 6/2007 | Xia | 1/1 |
| 7,657,780 | B2 * | 2/2010 | D'Souza et al. | 714/4 |
| 2001/0056463 | A1 * | 12/2001 | Grady et al. | 709/203 |
| 2003/0026254 | A1 * | 2/2003 | Sim | 370/392 |
| 2004/0138902 | A1 * | 7/2004 | Baca et al. | 705/1 |
| 2004/0225635 | A1 * | 11/2004 | Toyama et al. | 707/1 |
| 2004/0249691 | A1 * | 12/2004 | Schell et al. | 705/8 |
| 2005/0278378 | A1 * | 12/2005 | Frank | 707/104.1 |
| 2006/0149774 | A1 * | 7/2006 | Egnor | 707/102 |
| 2007/0027732 | A1 * | 2/2007 | Hudgens | 705/7 |
| 2007/0112777 | A1 * | 5/2007 | Field et al. | 707/10 |
| 2007/0288437 | A1 * | 12/2007 | Xia | 707/3 |
| 2008/0126404 | A1 * | 5/2008 | Slik et al. | 707/103 R |

* cited by examiner

Primary Examiner — Rehana Perveen
Assistant Examiner — Mark Hershley

(57) ABSTRACT

A telecommunications system includes a network; one or more user devices operably coupled to the network; one or more servers operably coupled to the network, the servers defining document storage locations; and a document management service including: a document address database configured to identify geographical locations associated with the document storage locations; a map display manager configured to cause a display to display a map of geographical locations associated with the document storage locations; and a geography manager configured to allow access to documents at locations defined by the document address database and displayed by the map display manager in association with a particular geographical location.

14 Claims, 5 Drawing Sheets

METHOD AND APPARATUS FOR INFORMATION AND DOCUMENT MANAGEMENT

BACKGROUND OF THE INVENTION

1. Field of the Invention

This invention relates to presenting user information. More particularly, the invention relates to methods for presenting user information and document management.

2. Description of the Related Art

Information and document management within business enterprises and to and from their clients or customers is increasingly based upon World Wide Web browser-type access. Typically, files are accessible as or via Web pages, which are hierarchically based and have a tree-structure. Access to the page is based upon a Uniform Resource Locator (URL), which defines the levels or branches of the tree-structure or hierarchy. As can be appreciated, URLs can become quite complex. Thus, navigation to known pages is often based upon a "hyperlink," in which the full complexity of the underlying URL may be hidden.

Even so, often the structure of the tree is unknown, or has changed and so the link is "broken" or invalid. In this case, it can be difficult for the unfamiliar user to navigate to the appropriate page or document location. In particular, it can require extensive searching for the user to find the appropriate information location. While another user can send the complete link to the person, this, too, can be difficult, and further requires the user himself to know the location.

SUMMARY OF THE INVENTION

A method according to embodiments of the present invention includes storing a plurality of documents; associating the plurality of documents with corresponding geographical locations; assigning geographical markers to the plurality of documents according to the geographical locations; and permitting access to the documents in accordance with the geographical locations.

A method according to embodiments of the present invention includes creating an enterprise map associated with an enterprise; and attaching information markers to predetermined locations on the enterprise map, said information markers being associated with information stored at a corresponding location.

A program product stored on one or more computer readable devices according to embodiments of the present invention includes code executable to index a plurality of documents according to associated geographical locations; code executable to cause a display device to display a map of user associated locations, the user associated locations defining locations of the plurality of documents; and code executable to allow access to the documents according to the map and the index of geographical locations.

An apparatus according to embodiments of the present invention includes a display device; an input device; and a processor configured to index a plurality of documents according to associated geographical locations; and cause the display device to display a map of user associated locations; and allow access to the documents according to the map and the index of geographical locations.

A telecommunications system in accordance with embodiments of the present invention includes a network; one or more user devices operably coupled to the network; one or more servers operably coupled to the network, the servers defining document storage locations; and a document management service including: a document address database configured to identify geographical locations associated with the document storage locations; a map display manager configured to cause a display to display a map of geographical locations associated with the document storage locations; and a geography manager configured to allow access to documents at locations defined by the document address database and displayed by the map display manager in association with a particular geographical location.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1:
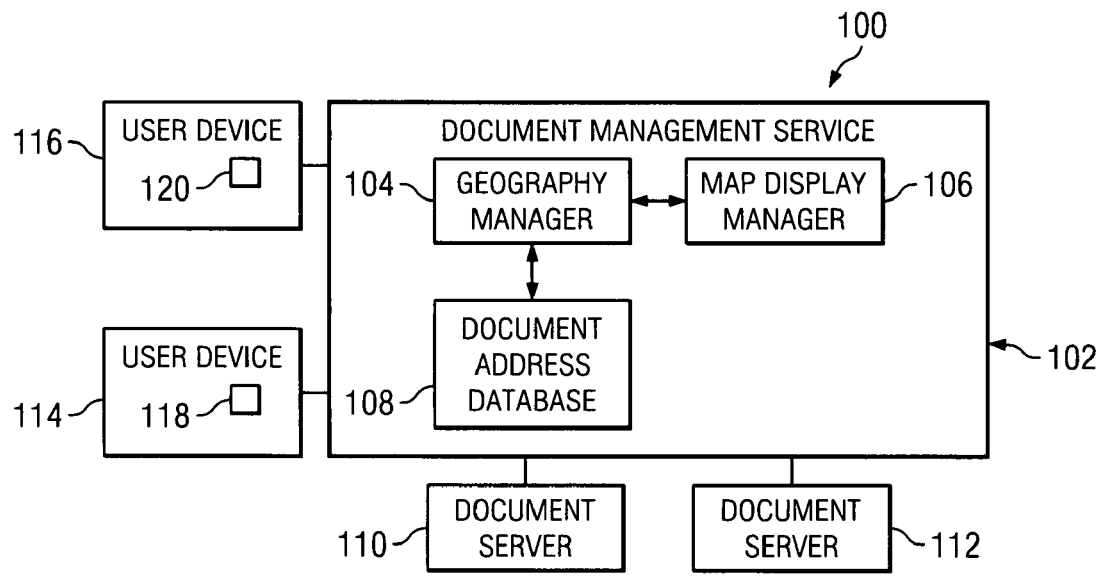
FIG. 1 illustrates an exemplary system in accordance with embodiments of the present invention.

Turning now to the drawings and, with particular attention to FIG. 1, a diagram of a telecommunications system 100 according to an embodiment of the present invention is shown. The system 100 includes a document management service 102 including or in communication with a geography manager 104, a map display manager 106, and a document address database 108.

ne or more document servers 110, 112 may be coupled to or in communication with the document management service 102. In certain embodiments, the document servers 110, 112 may be implemented as personal computers or servers operating as World Wide Web Internet or intranet servers. The document servers 110, 112 may thus store one or more documents in a known manner and accessible or addressable, for example, via a Uniform Resource Locator (URL).

User devices, such as user devices 114, 116 may be connected to or in communication with the document management service 102. In certain embodiments, the user devices 114, 116 may be implemented as telephones, cellular telephones, PDAs, computers, etc. For example, user devices 114, 116 may be embodied as personal computers implementing the Windows XP or Vista operating system and a web browser 118, 120, respectively, such as the Microsoft Explorer web browser.

As will be discussed in greater detail below, the map display manager 106 provides a map indicative of an enterprise's geographical locations or document storage locations. The map itself may be displayed to or accessible by the user devices 114, 116 through a suitable web page, as will be explained in greater detail below. The document address database 108 provides an identification or index of document locations for use by the geography manager 104. The document address database 108 thus may, for example, mark or tag the documents or document addresses with tags identifying or associating the documents with their geographical storage locations.

The geography manager 104 reads, for example, geography identifying tags on the document addresses or indices and may include, for example, a search engine that allows for display of documents in association with their geographic location and the map display manager 106. Alternatively, the map display manager 106 or the geography manager 104 may search through each address, or URL, on the network or Intranet and assign or determine a geographical association or marker.

Thus, for example, one or more documents may be uploaded to the document servers 110, 112. The document address database 108 may receive a list of the documents and associate a geographic tag identifying the geographic location with an address of the documents. Alternatively, the document address database 108 may search the URLS of the documents and derive therefrom a geographical location of the actual documents. The map display manager 106 displays to the user devices 114, 116 one or more maps marked with geographic locations of documents. The geography manager 104 receives inputs from the map display manager 106 and the document address database 108 and provides access to the documents when the geographic locations displayed by the map display manager 106 are accessed.

As will be discussed in greater detail below, the document management service 102 and its components, the geography manager 104, the map display manager 106, and the document address database 108, may be implemented in hardware and/or software operating on one or more servers, computer systems, host or mainframe computers, workstations, etc. In some embodiments, the document management service 102 and its components, the geography manager 104, the map display manager 106, and the document address database 108, may be operating on some or all of the same devices as other components in the system 100.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

Figure 2:
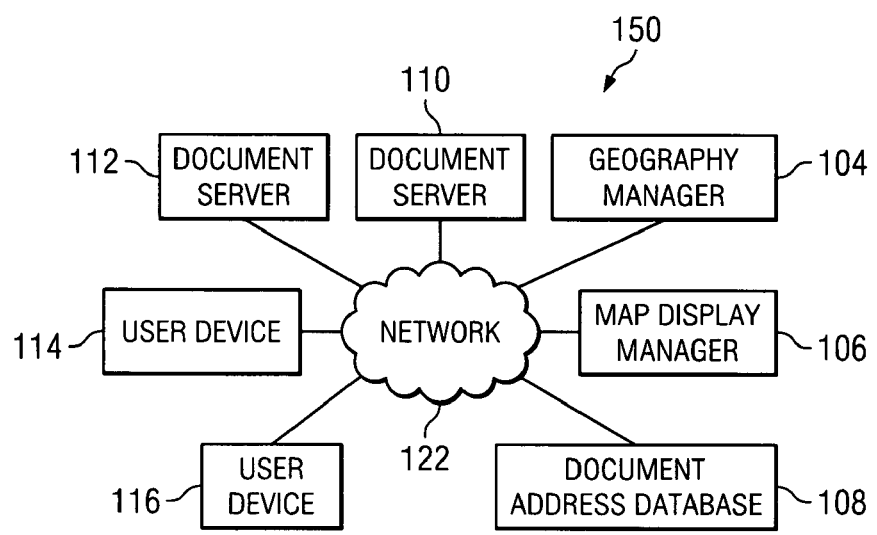
FIG. 2 illustrates an exemplary system in accordance with embodiments of the present invention.

In certain embodiments of the present invention, one or more of the components of the system 100 may be connected to or in communication with each other via a communication network. For example, turning now to FIG. 2, a system 150 including the components of the system 100 is illustrated, wherein some or all of the components are in communication via a network 122. The network 122 may be or include the Internet, World Wide Web, a local area network, or some other public or private computer, cable, telephone, client/server, peer-to-peer, or communication network or intranet.

In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, the public switched telephone network (PSTN), etc. Moreover, as used herein, communications include those enabled by wired or wireless technology. In some embodiments, some or all of the network 122 may be implemented using a TCP/IP network and may implement voice or multimedia over IP using, for example, the Session Initiation Protocol (SIP).

In operation, as will be explained in greater detail below, a user of a user device 114, 116 equipped with a web browser may log in or navigate to an appropriate web site and navigate to a geographic database navigation page maintained, for example, by or in association with the document management service 102. The map display manager 106 generates a map for the geographic database navigation page, which includes, for example, "clickable" hyperlinks related to geographical locations associated with the enterprise. If the user "clicks" on a link, then the geography manager 104 will generate and/or access a page displaying documents or contact information associated with the geographical location. In some embodiments, the listings are themselves "clickable" hyperlinks.

In some embodiments, as will be explained in greater detail below, one or more subsequent "layers" of geography may be provided by the map display manager 106. For example, if an enterprise has more than one location in a city, e.g., at two different addresses, selection of the city may cause a navigation to a new map displaying greater granularity.

Figure 3:
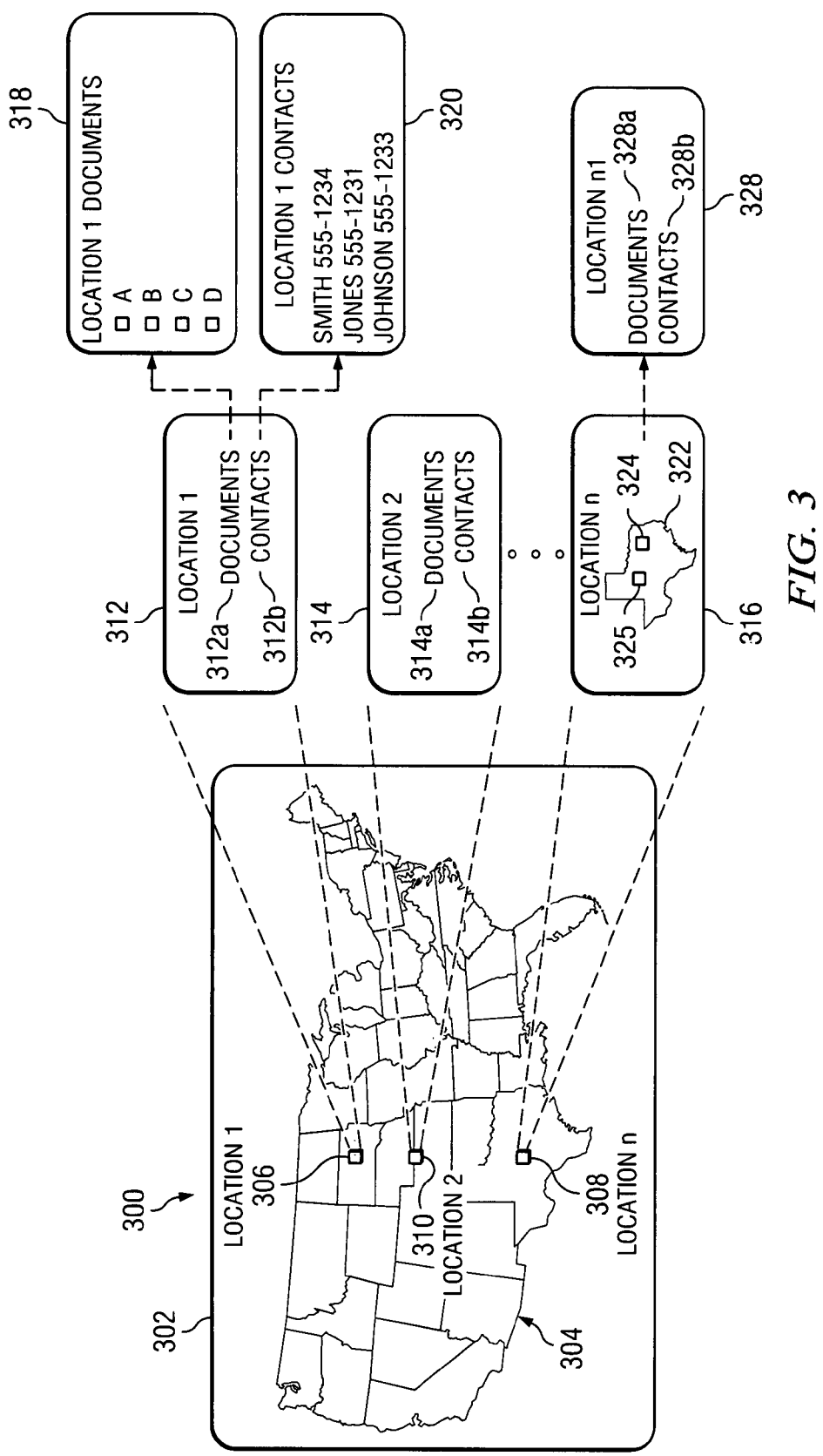
FIG. 3 schematically illustrates operation of an embodiment of the present invention.

A representation of a graphic display 300 that may be produced in a method embodying the principles of the invention is shown in FIG. 3. The display shown in FIG. 3 may be produced on a video display device associated with a user device that implements the invention. Example user stations and other components of a system implementing the present invention will be discussed in greater detail below.

Graphic display 300 includes an interface 302. Interface 302 may be implemented, for example, as a web browser type interface, such as one or more web pages running on a web browser such as Microsoft Explorer or Mozilla Firefox.

Shown in interface 302 is an exemplary map 304. The map 304 may be displayed on a geographic database navigation page and be generated by a map display manager 106 in accordance with embodiments of the present invention. The map 304 displays one or more locations 306, 308, 310. The locations may be, for example, an enterprise's business sites and may define locations of document centers or contact centers. In some embodiments, certain locations are associated with particular business units, such as Sales, Technical Support, etc.

In operation, a user may navigate a cursor (not shown) over one of the locations 306, 308, 310. In some embodiments, the locations 306, 308, 310 define clickable links provided by or generated by the geography manager 104 from tags or other information provided by the document address database 108. A subsequent "layer" or link related to the location is then displayed. In some embodiments, a navigation to a subsequent window may occur, or a window may be displayed within the current window.

For example, if the user navigates the cursor over location 306, the display 312 may be shown. As noted above, this may, for example, be a pop-up, or window-in-window display, or may be a "next" page linked by a standard hyperlink. As shown, the window 312 includes a Documents link 312*a* and a Contacts link 312*b*. In some embodiments, the user can click on the links 312*a*, 312*b* and navigate to a subsequent page that lists and/or links the corresponding documents or contacts for retrieval.

For example, he can click on Documents 312*a* and navigate to page 318, where he can retrieve various documents A, B, C, D. Such documents may be listed and accessible through hyperlinks, for example. The listing 318 may be generated by the geography manager 108 using, for example, search engine or scripting techniques.

Similarly, if the user clicks on Contacts 312*b*, he may navigate to a window 320, which displays a list of names and contacts associated with the location. As shown, the information may include a party name and telephone number, although other contact information may be provided, as well. In some embodiments, the contact list information is itself clickable, as well.

Similarly, if the user using interface 302 clicks or navigates over location 310 he can navigate to window 314, which displays lists or hyperlinks to Location 2 Documents 314*a* and Contacts 314*b*.

In some implementations, however, navigation over one link location in map 302 leads to a subsequent map location. For example, if the user navigates over location 308, he may be navigated to window 316, which shows a map 322 of greater resolution. In particular, the map 322 includes locations 324, 325. The user may click on one or the other of the locations and navigate to window 328, which displays the Documents link 328*a* and Contacts link 328*b*, similar to those of windows 312, 314, which allow navigation to pages similar to 318, 320.

It is noted that, while only one subsequent level of map is shown, in practice, multiple map layers may be provided. Further, while the linked pages generated by the geography manager 104 each show a documents listing and a contact listing, in practice only one or the other may be provided. Further, in some implementations, one or more links from a given location may be provided, defining documents of a particular type, for example. For example, link 306 could in some embodiments include a Documents link and a separate Contacts link. Further, while the initial layer is illustrated on the country level, in practice any degree of geographical resolution can be used. Thus, the figures are exemplary only.

Figure 4A:
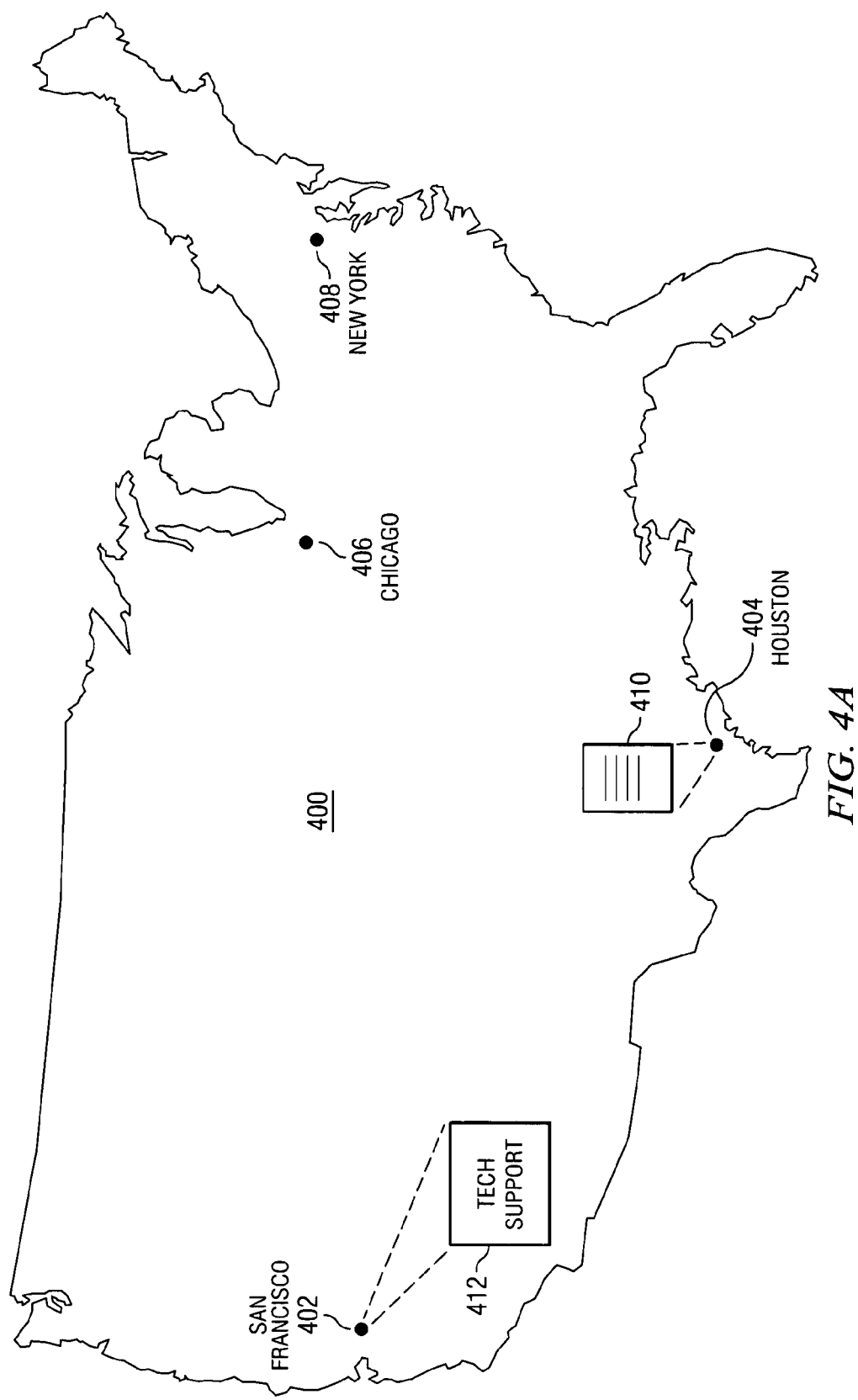
FIG. 4A and FIG. 4B schematically illustrate operation of an embodiment of the present invention.
Figure 4B:
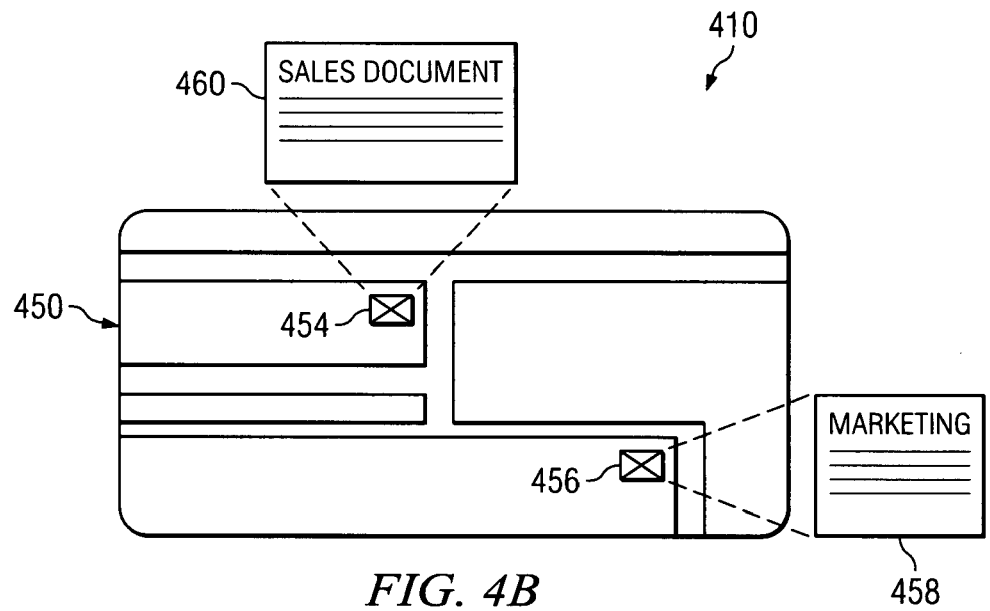

Turning now to FIG. 4A and FIG. 4B, diagrams illustrating exemplary graphical user interfaces according to specific embodiments of the present invention are shown by way of example.

For example, turning now to FIG. 4A a diagram illustrating an exemplary "enterprise map" 400 in accordance with embodiments of the present invention is shown. As discussed above, such an enterprise map may be generated by the map display manager 106. In the example illustrated, shown is a map 400 for an enterprise with locations in San Francisco 402, Houston 404, Chicago 406, and New York 408. Each location may be associated with a particular group, e.g., Tech Support, defining associated contacts and/or document types. In the example illustrated, sites San Francisco 402, Houston 404, Chicago 406, and New York 408 may define links to one or more "sub pages." In some embodiments, "clicking on" or navigating a cursor over the site will cause a display of a subsequent page, for example within the current window, such as 412 or 410.

In some embodiments, clicking on the display 410, 412, will cause a navigation to the corresponding page. For example, as discussed above, the geography manager 104 can display or generate from the document address database information one or more listings of associated documents or contacts. In some embodiments, the page is a destination page, listing, for example, desired documents or contacts in, for example, in a predetermined hierarchy, such as an alphabetical hierarchy. In other embodiments, the next page is a further geographic page, generated by the map display manager 106, as shown in FIG. 4B.

In particular, shown in FIG. 4B is a map 450, which may be, for example, a street-level map showing locations 454 and 456. That is, in some embodiments, a country or large geographic area is displayed; in subsequent maps, a smaller geographic area, such as a city or state, is displayed. In operation, a user can click on one of the locations 454, 456 and display another page 458. Again, this one my have a list of documents or contacts for selecting, indexed by location, or may further include a map of greater granulation.

It is noted that, while greater map resolution is shown on successive pages, in some embodiments, a control allowing the user to "zoom in" and "zoom out" may be provided in the initial mapping page. Thus, the figures are exemplary only.

Figure 5:
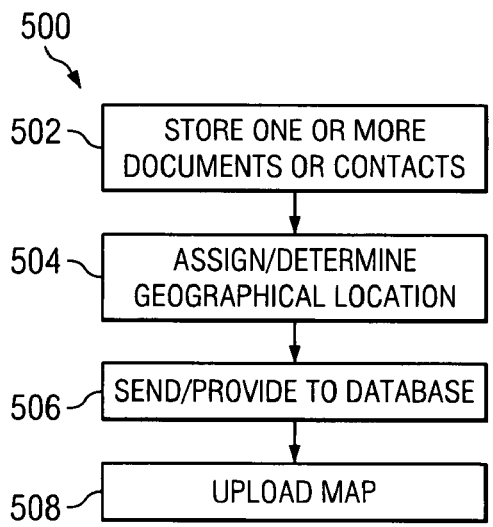
FIG. 5 is a flowchart illustrating operation of an embodiment of the present invention.

Turning now to FIG. 5, a flowchart 500 illustrating operation of embodiment of the present invention is shown. The particular arrangement of elements in the flowchart 500 is not meant to imply a fixed order to the elements; embodiments can be practiced in any order that is practicable.

As indicated at process block 502, the invention includes storing one or more documents. For example, in some embodiments, one or more documents may be uploaded to an Internet or Intranet web server, and assigned a predetermined URL, or Uniform Resource Locator. As indicated in a process block 504, the document may be assigned or may be given a geographic association or location by way of a tag or simply by the URL itself. In a process step 506, the geographical information associated with the documents may be provided to a database, such as the document address database 108. In a process step 508, a geographic map of document locations may be uploaded to one or more servers.

Figure 6:
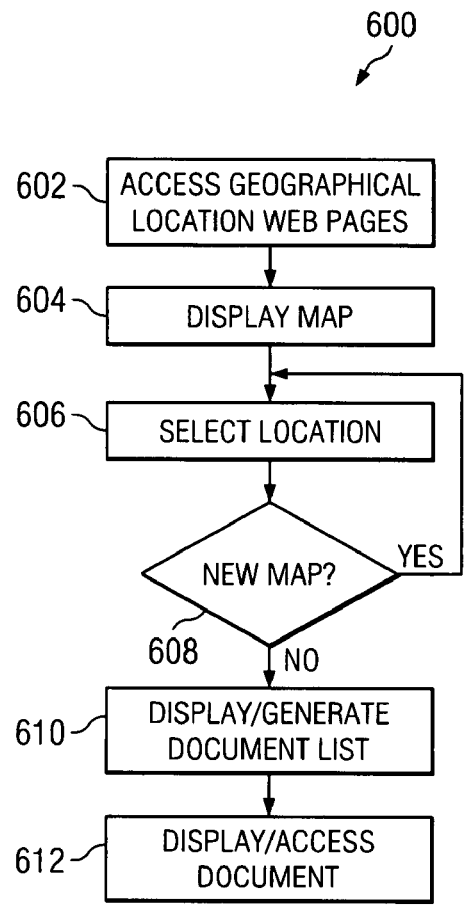
FIG. 6 is a flowchart illustrating operation of an embodiment of the present invention.

Turning now to FIG. 6, a flowchart 600 illustrating operation of embodiment of the present invention is shown. The particular arrangement of elements in the flowchart 600 is not meant to imply a fixed order to the elements; embodiments can be practiced in any order that is practicable.

Initially, in a process step 602, a user can employ his interface, such as a web browser, to access a geographic location web page, such as discussed above. Such a web page may, for example, be associated with a known enterprise. In a process step 604, the web page can display the geographic map of the enterprise's locations or business units, including, for example, hyperlinks to documents or other maps. In a process step 606, the user can select a location on the map that is associated with the hyperlink. If the location is not associated with a lower level map, as determined in a step 608, then the corresponding document list will be generated and/or displayed, in a step 610. For example, such a list may be provided and generated using search engine or scripting techniques. Finally, in a step 612, one or more of the desired documents may be accessed. If there is a lower level of display, as determined in step 608, then the process will cycle to step 606.

Figure 7:
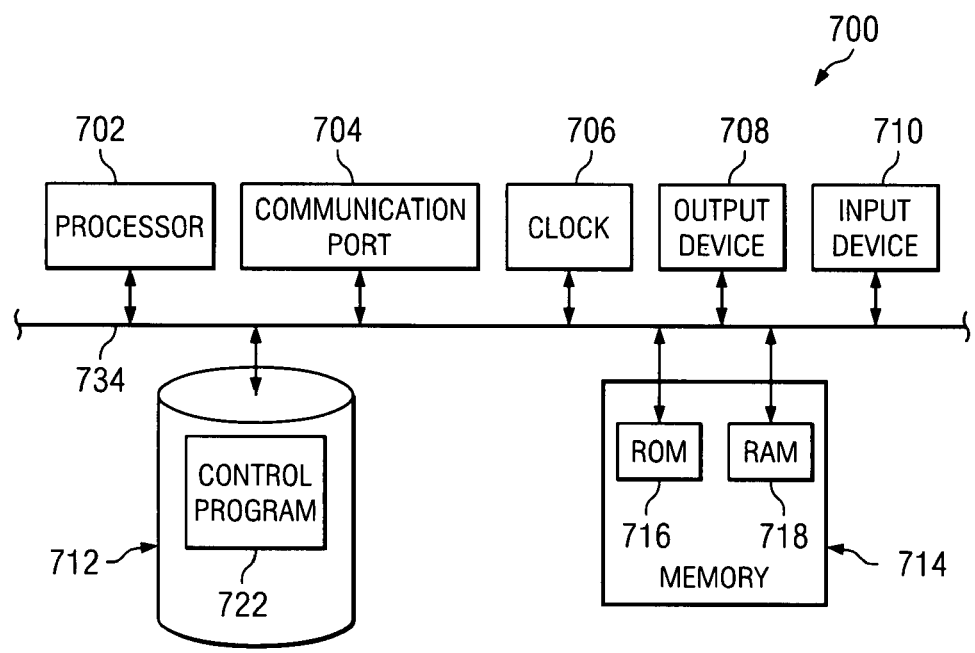
FIG. 7 is a diagram of a network system in accordance with embodiments of the present invention.

Now referring to FIG. 7, a representative block diagram of a computer or processing device 700 suitable for use as a user device or a server according to embodiments of the present invention is shown. In particular, the computer 700 may be a device suitable for accessing or implementing a document management service or a document server in accordance with embodiments of the present invention. In some embodiments, the computer 700 may include or operate a web browser or the document management service. The computer 700 may be embodied as a single device or computer, a networked set or group of devices or computers, a workstation, mainframe or host computer, etc. In some embodiments, the computer 700 may implement one or more elements of the methods disclosed herein.

The computer 700 may include a processor, microchip, central processing unit, or computer 702 that is in communication with or otherwise uses or includes one or more communication ports or network interfaces 704 for communicating with user devices and/or other devices. The communication ports 704 may include such things as telephone adapters, local area network adapters, wireless communication devices, Bluetooth technology, etc. The computer 700 also may include an internal clock element 706 to maintain an accurate time and date for the computer 700, create time stamps for communications received or sent by the computer 700, etc.

If desired, the computer 700 may include one or more output devices 708 such as a printer, infrared or other transmitter, antenna, display screen or monitor, text to speech converter, speaker, etc., as well as one or more input devices 710 such as a bar code reader or other optical scanner, infrared or other receiver, antenna, magnetic stripe reader, image scanner, roller ball, touch pad, joystick, touch screen, computer keyboard, computer mouse, microphone, etc.

In addition to the above, the computer 700 may include a memory or data storage device 712 to store information, software, databases, documents, communications, device drivers, etc. The memory or data storage device 712 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 712 may include various combinations of moveable and fixed storage. The computer 700 also may include memory 714, such as ROM 716 and RAM 718.

The processor 702 and the data storage device 712 in the computer 700 each may be, for example: (i) located entirely within a single computer or other computing device; or (ii) connected to each other by a remote communication medium, such as a serial port cable, telephone line or radio frequency transceiver. In one embodiment, the computer 700 may be implemented as one or more computers that are connected to a remote server computer, as will be explained in greater detail below.

A conventional personal computer or workstation with sufficient memory and processing capability may be used as the computer 700. The computer 700 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 702. Other suitable processors may be available from Motorola, Inc., AMD, or Sun Microsystems, Inc. The processor 702 also may be embodied as one or more microprocessors, computers, computer systems, etc.

Software may be resident and operating or operational on the computer 700. The software may be stored on the data storage device 712 and may include a control program 722. The control program 722 may implement an operating system, such as Microsoft Windows. In user device implementations, the control program 722 may further implement a web browser. In document management service implementations, the control program 722 may implement the map display manager 106, the geography manager 104, and the document address database 108.

It is noted that, while illustrated as software stored in storage medium 712, the various control modules in accordance with embodiments of the present invention may also include related firmware and/or hardware components. Thus, the figure is exemplary only.

The control program 722 may control the processor 702. The processor 702 may perform instructions of the control programs, and thereby operate in accordance with the methods described in detail herein. The control programs may be stored in a compressed, uncompiled and/or encrypted format. The control programs furthermore include program elements that may be necessary, such as an operating system, a database management system and device drivers for allowing the processor 702 to interface with peripheral devices, databases, etc. Appropriate program elements are known to those skilled in the art, and need not be described in detail herein.

According to some embodiments, the instructions of the control program may be read into a main memory from another computer-readable medium, such as from the ROM 716 to the RAM 718. Execution of sequences of the instructions in the control program causes the processor 702 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 702, communication ports 704, clock 706, output device 708, input device 710, data storage device 712, ROM 716 and RAM 718 may communicate or be connected directly or indirectly in a variety of ways. For example, the processor 702, communication ports 704, clock 706, output device 708, input device 710, data storage device 712, ROM 716 and RAM 718 may be connected via a bus 734.

While specific implementations and hardware/software configurations for the computer 700 have been illustrated, it should be noted that other implementations and hardware configurations are possible and that no specific implementation or hardware/software configuration is needed. Thus, not all of the components illustrated in FIG. 7 may be needed for the computer 700 implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2005), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method, comprising:
    storing a plurality of documents distributed amongst a plurality of geographical locations, each document being located in a corresponding geographical location;
    associating the plurality of documents with respective corresponding geographical locations;

associating at least one party with each of the geographical locations such that respective geographical locations have at least one party associated as a contact for that geographical location;

assigning geographical markers to the plurality of documents according to the respective geographical locations; and permitting access to contact information for the at least one party associated with a geographical location in accordance with selecting that geographical location and also permitting access to documents located in that geographical location in accordance with the selecting of that geographical location; and wherein the access to the contact information is permitted via at least one clickable indicia displayed to a user and the access to the documents is permitted via at least one clickable indicia displayed to the user at a same time the at least one clickable indicia for the contact information is displayed to the user, the at least one clickable indicia for access to the contact information being different or separate from the at least one clickable indicia for access to the documents.

2. A method in accordance with claim 1, wherein the geographical locations include a plurality of sites that retain the documents.

3. A method in accordance with claim 1, wherein the documents are grouped according to a project associated with the geographical location.

4. A method in accordance with claim 1 wherein the at least one clickable indicia displayed to the user for access to the contact information and the at least one clickable indicia displayed to the user for access to the documents are displayed after the user clicks indicia on a map illustrating where the geographical locations are located that is displayed to the user.

5. An apparatus comprising:
a display device;
an input device; and
a processor configured to:
index a plurality of documents distributed among a plurality of geographical locations according to respective associated geographical locations,
cause the display device to display a map of user associated locations, each of the user associated locations representing one of the geographical locations,
cause the display device to display contact information for the user associated locations after a selection of a respective one of the user associated locations, the contact information comprising at least one party name and a respective telephone number for each of the at least one party name, the contact information being displayable via at least one clickable indicia displayed after the respective one of the user associated locations is selected, and
allow access to the documents at the selected one of the user associated locations, access to the documents permitted via at least one clickable indicia displayed after the respective one of the user associated locations is selected; and
the at least one clickable indicia for the contact information being displayed at a same time the at least one clickable indicia for access to the documents is displayed, the at least one clickable indicia for the contact information being different or separate from the at least one clickable indicia for access to the documents.

6. An apparatus in accordance with claim 5, wherein the geographical locations are locations where the plurality of documents are stored.

7. An apparatus in accordance with claim 6, wherein the contact information is displayed as a contact list that is clickable.

8. A program product stored on one or more computer readable devices, the program product comprising:
code executable to index a plurality of documents distributed amongst a plurality of geographical locations according to respective associated geographical locations;
code executable to cause a display device to display a map of user associated locations, the user associated locations defining respective locations for each of the plurality of documents;
code executable to cause the display device to display contact information for at least one contact associated with the user associated locations; and
code executable to allow access to the documents and the contact information at each location responsive to selecting a respective location and according to the map and the index of geographical locations;
code executable to allow selection of contact information to occur by a user selecting at least one clickable indicia displayed to the user by the display device after the selecting of the respective location;
code executable to allow the access to the documents to occur by the user selecting at least one clickable indicia displayed to the user after the selecting of the respective location; and
the at least one clickable indicia for the contact information being displayed at a same time the at least one clickable indicia for access to the documents is displayed, the at least one clickable indicia for access to the contact information being different or separate from the at least one clickable indicia for access to the documents.

9. A program product in accordance with claim 8, wherein the code executable to cause the display device to display the map of user associated locations comprises code executable to display a layered map of user associated locations.

10. A program product in accordance with claim 8, wherein the code executable to cause the display device to display the map of user associated locations includes a web browser.

11. A program product in accordance with claim 8, wherein the code executable to index the plurality of documents according to the respective associated geographical locations includes code executable to search a plurality of uniform resource locators and provide geographical associations.

12. A program product in accordance with claim 8, wherein the code executable to allow access to the documents according to the map and the index of geographical locations includes code executable to receive one or more tags defining geographical associations of documents.

13. A program product in accordance with claim 8, wherein the at least one clickable indicia for access to the documents provides access to a hyperlinked list of documents associated with a particular geographical location when that at least one clickable indicia is selected and wherein the at least one clickable indicia for the contact information provides access to a clickable list of contact information when selected.

14. A telecommunications system, comprising:
a network;
one or more user devices operably coupled to the network;

one or more servers operably coupled to the network, the servers defining geographically distributed document storage locations, each location storing one or more documents; and a document management service comprising:
- a document address database configured to identify geographical locations associated with the document storage locations;
- a map display manager configured to cause a display to display a map of geographical locations associated with the document storage locations, the map display manager configured to display contact information for contacts assigned to respective geographical locations after a selection of a respective one of the displayed geographical locations;
- a geography manager configured to allow access to documents stored at respective locations defined by the document address database and displayed by the map display manager in association with a particular geographical location responsive to the selection of the respective one of the displayed geographical locations;

wherein the contact information is displayed via a selection of at least one clickable indicia for the contact information; and wherein the access allowed to the documents stored at the selected respective one of the displayed geographical locations is provided via at least one clickable indicia, and the at least one clickable indicia for the contact information being displayed at a same time the at least one clickable indicia for access to the documents is displayed, the at least one clickable indicia for access to the contact information being different or separate from the at least one clickable indicia for access to the documents.

* * * * *